(12) United States Patent
Leiserson et al.

(10) Patent No.: US 10,872,175 B2
(45) Date of Patent: Dec. 22, 2020

(54) ERASING A CRYPTOGRAPHIC ITEM IN A MEMORY OF A DEVICE IN RESPONSE TO A CHANGE OF AN OPERATING MODE OF THE DEVICE

(71) Applicant: Fortanix, Inc., Mountain View, CA (US)

(72) Inventors: Andrew Leiserson, San Francisco, CA (US); Jethro Gideon Beekman, San Francisco, CA (US)

(73) Assignee: Fortanix, Inc., Mountain View, CA (US)

(*) Notice: Subject to any disclaimer, the term of this patent is extended or adjusted under 35 U.S.C. 154(b) by 195 days.

(21) Appl. No.: 16/212,376

(22) Filed: Dec. 6, 2018

(65) Prior Publication Data

US 2020/0184114 A1     Jun. 11, 2020

(51) Int. Cl.
| | | |
|---|---|---|
| *G06F 21/78* | (2013.01) | |
| *G06F 21/74* | (2013.01) | |
| *G06F 21/81* | (2013.01) | |
| *G06F 3/06* | (2006.01) | |
| *H04L 9/32* | (2006.01) | |

(52) U.S. Cl.
CPC ............ *G06F 21/78* (2013.01); *G06F 3/0604* (2013.01); *G06F 3/0634* (2013.01); *G06F 3/0673* (2013.01); *G06F 21/74* (2013.01); *G06F 21/81* (2013.01); *H04L 9/3247* (2013.01); *G06F 2221/2143* (2013.01)

(58) Field of Classification Search
CPC .......... G06F 21/78; G06F 21/74; G06F 21/81; G06F 3/0604; G06F 3/0634; G06F 3/0673; G06F 2221/2143; H04L 9/3247; H04L 9/0894; H04L 9/0891
See application file for complete search history.

(56) References Cited

U.S. PATENT DOCUMENTS

| | | | |
|---|---|---|---|
| 7,721,107 B2* | 5/2010 | Golle ...................... G06F 21/36 | 713/184 |
| 2007/0268138 A1* | 11/2007 | Chung ................. G06Q 10/087 | 340/572.1 |
| 2008/0033892 A1* | 2/2008 | Neri-Badillo ......... G07F 15/003 | 705/412 |
| 2012/0023589 A1* | 1/2012 | Walrath ................ H04W 12/12 | 726/26 |
| 2012/0039469 A1* | 2/2012 | Mueller ................. G06Q 20/12 | 380/252 |
| 2012/0093318 A1* | 4/2012 | Obukhov ................ G06F 21/79 | 380/277 |
| 2013/0294602 A1* | 11/2013 | Huxham ............. H04L 63/0428 | 380/255 |
| 2016/0135048 A1* | 5/2016 | Huxham ......... H04W 12/00409 | 455/411 |
| 2017/0222816 A1* | 8/2017 | Bartley .................... G09C 1/00 | |
| 2018/0174158 A1* | 6/2018 | Endress ................ H04L 9/3278 | |

(Continued)

*Primary Examiner* — Cheng-Feng Huang
(74) *Attorney, Agent, or Firm* — Lowenstein Sandler LLP

(57) ABSTRACT

An indication of a change to an operating mode of a device may be received. A cryptographic item stored at a memory of the device may be identified. In response to receiving the indication of the change to the operating mode of the device, the cryptographic item stored at the memory may be modified. The device may operate in the changed operating mode based on the modified cryptographic item.

12 Claims, 6 Drawing Sheets

(56) References Cited

U.S. PATENT DOCUMENTS

| | | | | |
|---|---|---|---|---|
| 2018/0285369 A1* | 10/2018 | Lazier | .................. | G06F 16/122 |
| 2019/0052461 A1* | 2/2019 | Kreder, III | ............ | H04L 9/3247 |
| 2019/0334730 A1* | 10/2019 | Endress | ............. | G06K 9/00577 |
| 2020/0139932 A1* | 5/2020 | Wood | ...................... | B60R 25/30 |

* cited by examiner

ERASING A CRYPTOGRAPHIC ITEM IN A MEMORY OF A DEVICE IN RESPONSE TO A CHANGE OF AN OPERATING MODE OF THE DEVICE

TECHNICAL FIELD

Aspects of the present disclosure relate generally to an operating mode of a device, and more specifically, relate to the erasing of a cryptographic item in a memory of the device in response to a change of the operating mode of the device.

BACKGROUND

A device may operate in a first mode that is based on standards that define the functionality of the device when the device is operating in the first mode. At a later time, the device may operate in a second mode that is not based on the standards of the first mode. The functionality of the device in the first mode may be more limited than the functionality of the device in the second mode. For example, the device may be capable of performing more operations when the device is in the second mode as opposed to when the device is in the first mode.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
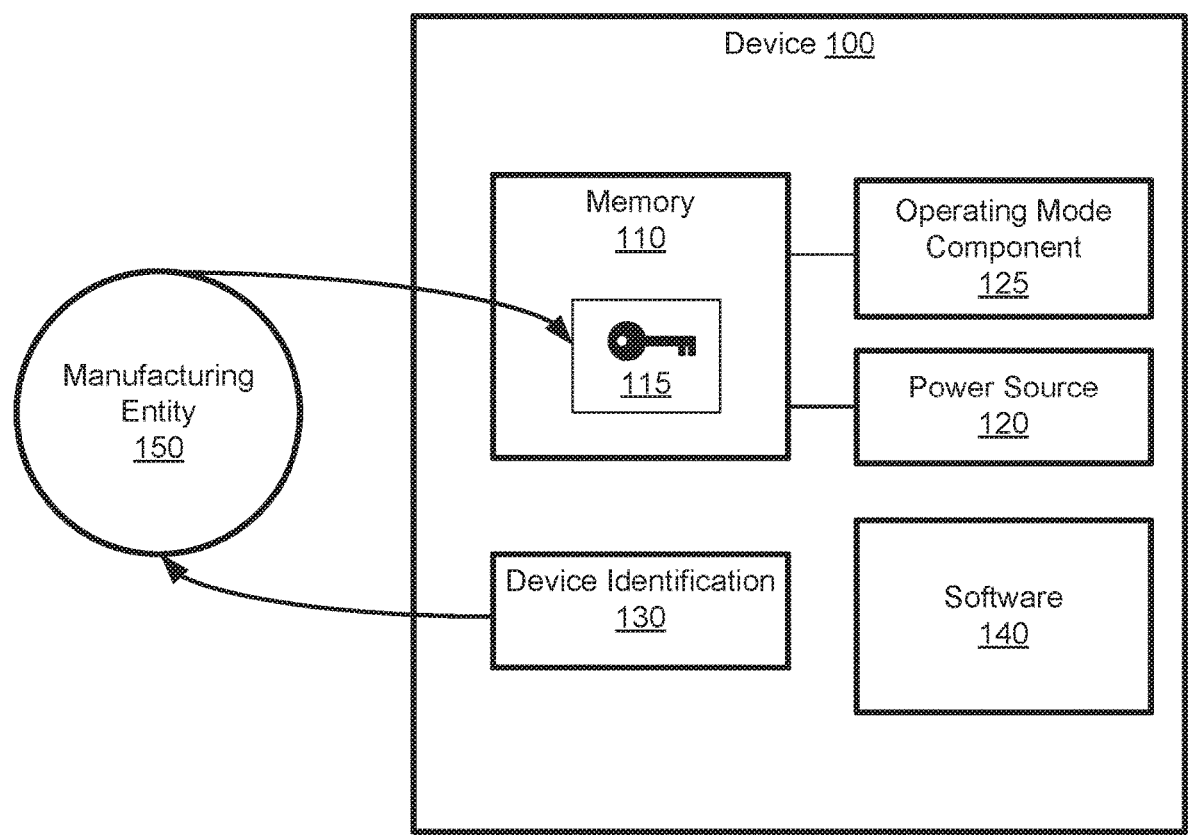
FIG. 1 illustrates an example device to erase a cryptographic item in a memory of the device in response to a change of the operating mode of the device in accordance with some embodiments.

Aspects of the present disclosure relate to the erasing of a cryptographic item in a memory of the device in response to a change of the operating mode of the device. In general, a device may be configured to function in a restricted operating mode. In some embodiments, the restricted operating mode may correspond to a configuration of the device that is used to specify the functionality of the device when in the restricted operating mode. An example of a restricted operating mode includes, but is not limited to, a mode conforming to Federal Information Processing Standard (FIPS) 140.

The operating mode of the device may change over time. For example, a user of the device may seek to operate the device with functionality that is not enabled when the device is in the restricted operating mode. For example, the user may seek to operate the device in a non-restricted operating mode that provides different functionality than the device when the device is in the restricted operating mode. In some embodiments, the non-restricted operating mode may configure the device to be able to perform more types of operations than when the device is in the restricted operating mode. However, if the operating mode of the device is changed from the restricted operating mode to the non-restricted operating mode, then a user of the device may modify the hardware or software of the device. For example, the user can proceed to modify the device after changing the device to the non-restricted operating mode. Such a modification may result in the device not satisfying the requirements of a standard (e.g., FIPS). Furthermore, the modification may also persist after subsequent changes to the operating mode. For example, the changes to the device when the device was in the non-restricted operating mode can persist if the device is returned to the restricted operating mode. Thus, if the user changes the operating mode of the device from the non-restricted operating mode back to the restricted operating mode, then the device may not satisfy the requirements of the standard that corresponds to the restricted operating mode.

Aspects of the present disclosure address the above and other deficiencies by erasing a cryptographic item in a memory of the device in response to a change of the operating mode of the device. For example, an identification of the device may be signed with a digital signature (i.e., the cryptographic item). The identification of the device may be unique to the device (e.g., not shared with other similar devices) and the digital signature may be generated from a private key of a manufacturing entity. In some embodiments, the manufacturing entity may be a separate entity from the device. For example, the manufacturing entity may be a server that is coupled with the device and that stores the private key separate from the device. The manufacturing entity may transmit the signed device identification to a memory of the device. The signed device identification may be used to indicate that the device is functioning in the restricted operating mode.

If the user of the device changes the operating mode of the device from the restricted operating mode to the non-restricted operating mode, then the signed device identification may be erased from the memory of the device. In some embodiments, the signed device identification may be stored in a volatile memory of the device and power of the volatile memory may be halted or stopped, resulting in the loss of the signed device identification. In the same or alternative embodiments, the device may overwrite or erase the signed device identification from a non-volatile memory. Since the private key used to sign the device identification is not accessible to the device (e.g., the private key is only accessible by the manufacturing entity), then the loss (e.g., erasing or overwriting) of the signed device identification may be irrevocable and the device cannot regenerate the signed device identification. As such, if the signed device identification is erased from the memory of the device when the device changes from the restricted operating mode to the non-restricted operating mode, then the signed device identification cannot be restored to the memory of the device when the device returns from the non-restricted operating mode to the restricted operating mode. As such, the absence of the signed device identification may indicate that the device does not satisfy the requirements of a standard corresponding to the restricted operating mode.

Advantages of the present disclosure include, but are not limited to, the improved security of the device by facilitating the device to meet the requirements of particular standards that correspond to the restricted operating mode. Since the signed device identification cannot be regenerated or recovered by the device itself, then the erasing of the signed device identification from a memory of the device may provide an indication that the device has changed from the restricted operating mode. As such, a user of the device may be aware that the security of the device may be compromised or that the device no longer meets the requirements of a particular standard that corresponds to the restricted operating mode.

FIG. 1 illustrates an example device to erase a cryptographic item in a memory of the device in response to a change of the operating mode of the device. The device 100 may include an operating mode component 125 that corresponds to processing logic that may include hardware (e.g., processing device, circuitry, dedicated logic, programmable logic, microcode, hardware of a device, integrated circuit, etc.), software (e.g., instructions run or executed on a processing device), or a combination thereof.

As shown in FIG. 1, the device 100 may include a device identification 130 that may correspond to a unique identification (e.g., any combination of numbers or letters). The device identification 130 may be implemented in silicon (e.g., a circuit) of the device 100, a secure enclave key of a processing environment as described in conjunction with FIG. 5, or a physically unclonable function (PUF) of the device 100. In some embodiments, the PUF may correspond to a random value that is generated from hardware characteristics of the device. The device identification 130 may be retrieved by a manufacturing entity 150. In some embodiments, the manufacturing entity 150 may be separate and external from the device 100. For example, the manufacturing entity 150 may be a server or manufacturing tool that is coupled with the device 100 at manufacturing or assembling of the device. The manufacturing entity 150 may store a private key that is not accessible by the device 100. The private key may be used to sign the retrieve device identification 130 and the signed device identification 115 may be stored in a memory 110 of the device. The memory 110 may be a volatile memory or a non-volatile memory.

The signed device identification 115 may be referred to as a cryptographic item that represents that the device 100 is in a restricted operating mode and has not changed from the restricted operating mode. In some embodiments, the restricted operating mode may specify a functionality or implementation of the software 140 that is executed by the device 100. For example, the software 140 may implement the functionality of the restricted operating mode or may implement the functionality of the non-restricted operating mode if the operating mode of the device 100 is changed. As previously described, the memory 110 may be a volatile memory. In such an embodiment, the memory 110 may be coupled with a power source 120 (e.g., a battery or other such power source).

In operation, the operating mode component 125 may receive an indication that the software 140 of the device 100 has changed so that the operating mode of the device 100 has changed from the restricted operating mode to the non-restricted operating mode. In response to the change, the operating mode component 125 may interrupt or halt the providing of power by the power source 120 to the memory 110. For example, a connection between the power source 120 and the memory 110 may be disconnected or interrupted. As a result, the memory 110 may lose power and the signed device identification 115 may be erased as the memory 110 may be a volatile memory that loses contents when power is no longer provided.

Figure 2:
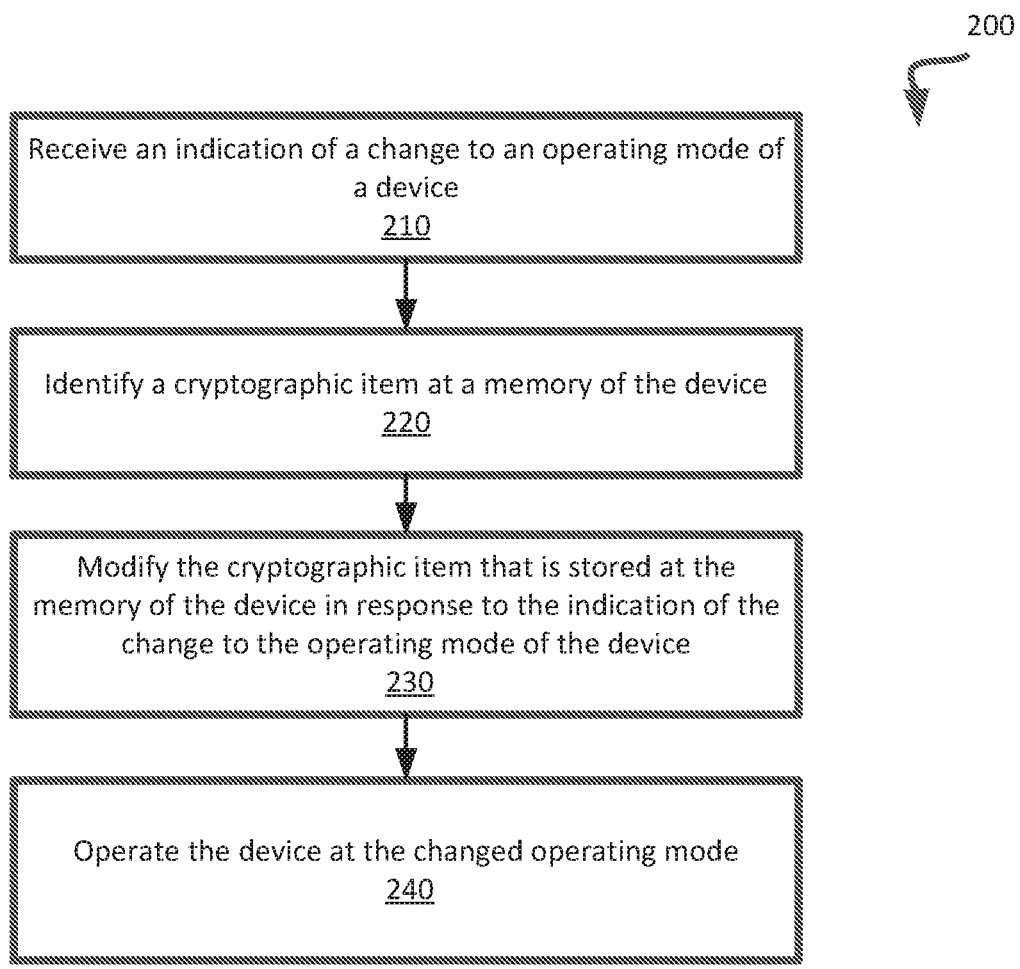
FIG. 2 is a flow diagram of an example method to modify a cryptographic item in a memory in response to a change to an operating mode of a device in accordance with some embodiments of the present disclosure.

FIG. 2 is a flow diagram of an example method 200 to modify a cryptographic item in a memory in response to a change to an operating mode of a device. In general, the method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 may be performed by the operating mode component 125 of FIG. 1.

For simplicity of explanation, the methods of the present disclosure are depicted and described as a series of acts. However, acts in accordance with the present disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

As shown in FIG. 2, the method 200 may begin with processing logic receiving an indication of a change to an operating mode of a device (block 210). For example, a user of the device may change the device from a restricted operating mode to a non-restricted operating mode. The change to the operating mode of the device may result in fewer operations or types of operations being available to be performed by the device. For example, the restricted operating mode may provide a first functionality for the device (e.g., the enforcing of certain cryptographic operations or standards) and the non-restricted operating mode may provide a different second functionality for the device (e.g., not enforcing certain cryptographic operations or standards). In some embodiments, the indication of the change to the operating mode may be in response to a change in the software functionality of the device. For example, the device may include a non-volatile memory that stores software that is used to provide the functionality of the restricted operating mode. The user may update or change the software to provide the functionality of the non-restricted operating mode. Thus, the change of the operating mode of the device may be a result of a software change to the device. In the same or alternative embodiments, the change to the operating mode of the device may be in response to a tampering of the device or other such unauthorized use or action with the device. For example, the tampering of the device may correspond to an opening of the device, a replacement of any component of the device, a change to the software of the device, a change of environment at which the device operates, etc.

The processing device may further identify a cryptographic item at a memory of the device (block 220). In some embodiments, the cryptographic item may be a device identification that has been signed by a manufacturing entity. The signed device identification may be stored in a volatile memory of the device or in a non-volatile memory of the device. Thus, the cryptographic item may be data that is unique to the device (e.g., the device identification) that has been signed by a private key of the manufacturing entity where the private key is not accessible to the device.

Referring to FIG. 2, the processing device may modify the cryptographic item that is stored at the memory of the device in response to receiving the indication of the change to the operating mode of the device (block 230). For example, if the memory is a volatile memory, then power that has been provided to the volatile memory may be interrupted or halted, resulting in the loss of any data stored at the volatile memory. As such, the signed device identification may be erased from the volatile memory. If the memory is a non-volatile memory or a volatile memory, then the device may overwrite or erase the signed device identification in response to receiving the indication of the change to the operating mode of the device. The processing device may subsequently operate the device at the changed operating mode (block 240). For example, the device may function in the non-restricted operating mode after the signed device identification has been erased or overwritten from the memory.

The absence of the signed device identification in the memory may be used to indicate that the device is no longer functioning in the restricted operating mode and may not revert to the restricted operating mode unless the device is later provided to the manufacturing entity to be reset to the restricted operating mode. For example, if the device is in the non-restricted operating mode, then the user of the device may provide the device to the manufacturing entity to regenerate the signed device identification and to store the signed device identification after the device is reset by the manufacturing entity.

As such, a user of the device may use the device in a restricted operating mode. In some embodiments, the first or initial operating mode of the device may be the restricted operating mode. The user may later wish to operate the device in the non-restricted operating mode. For example, the user may no longer seek to operate the device to satisfy requirements of a particular standard that the restricted operating mode provides (e.g., use the device for a different purpose, enter into a diagnosis mode, etc.). The user may then change the function of the device (e.g., update software) and the signed device identification may be modified (e.g., erased or overwritten) when the user changes the operating mode.

Figure 3:
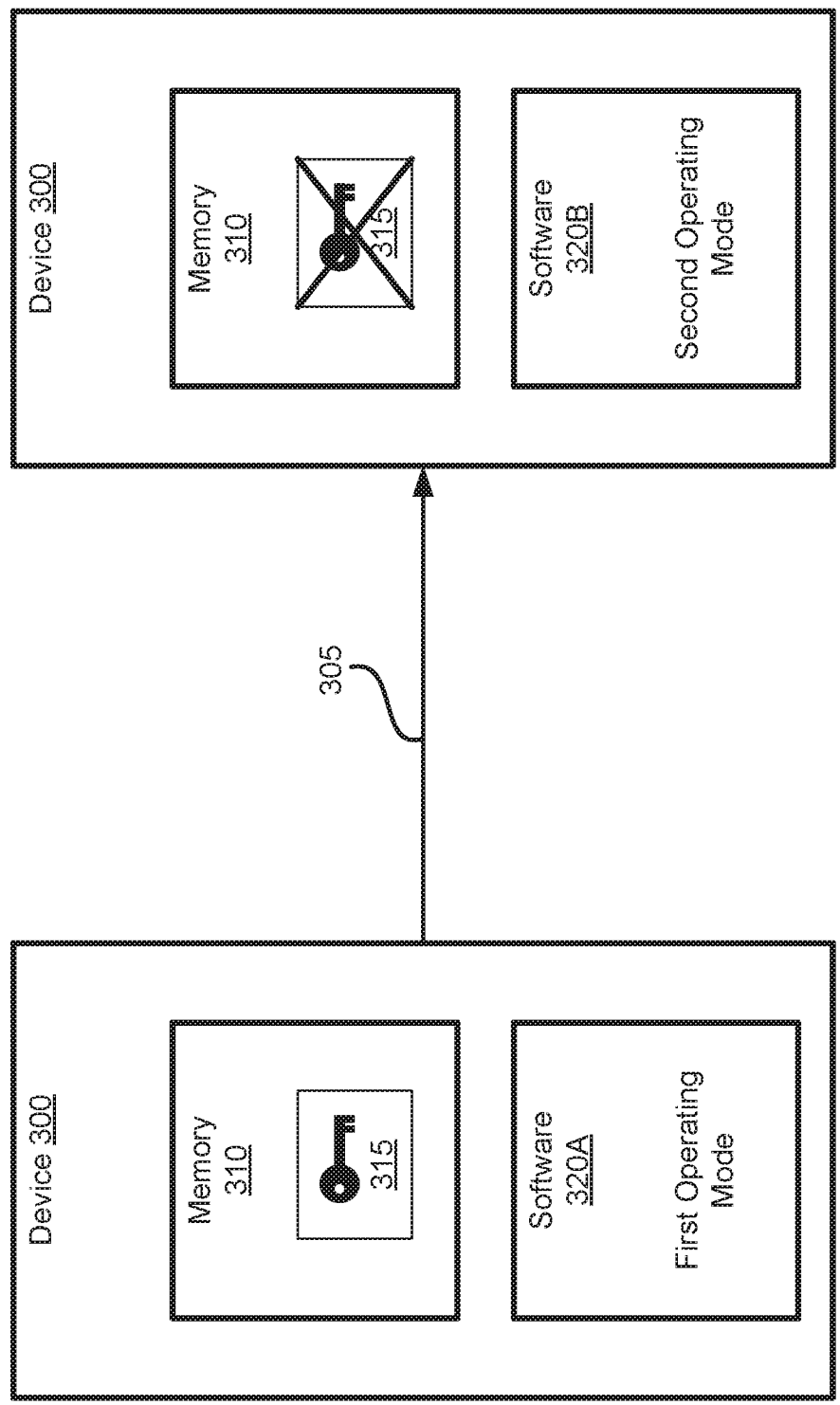
FIG. 3 illustrates a block diagram of the erasing of a cryptographic item in accordance with some embodiments of the present disclosure.

FIG. 3 illustrates a block diagram of the erasing of a cryptographic item. In general, the operating mode component (e.g., the operating mode component 125 of FIG. 1) may erase the cryptographic item from a memory 310 of a device 300.

As shown in FIG. 3, the device 300 may function in a first operating mode at a first or initial time. For example, the software 320A may provide the functionality of a restricted operating mode for the device 300. Furthermore, the memory 310 of the device 300 may store the signed device identification 315 or other such cryptographic items or data. A user of the device 300 may provide an update 305 to the software 320A of the device 300. The update 305 may change the device from the first operating mode to a second operating mode. The software 320B may provide the functionality of the second operating mode. In response to the update to the software operating at the device 300, the device may erase the signed device identification 315 from the memory 310. For example, a power source to the memory 310 may be switched off or disconnected to erase the signed device identification 315 or a write operation or erase operation may be used to overwrite the signed device identification 315 or to erase the signed device identification 315.

Figure 4:
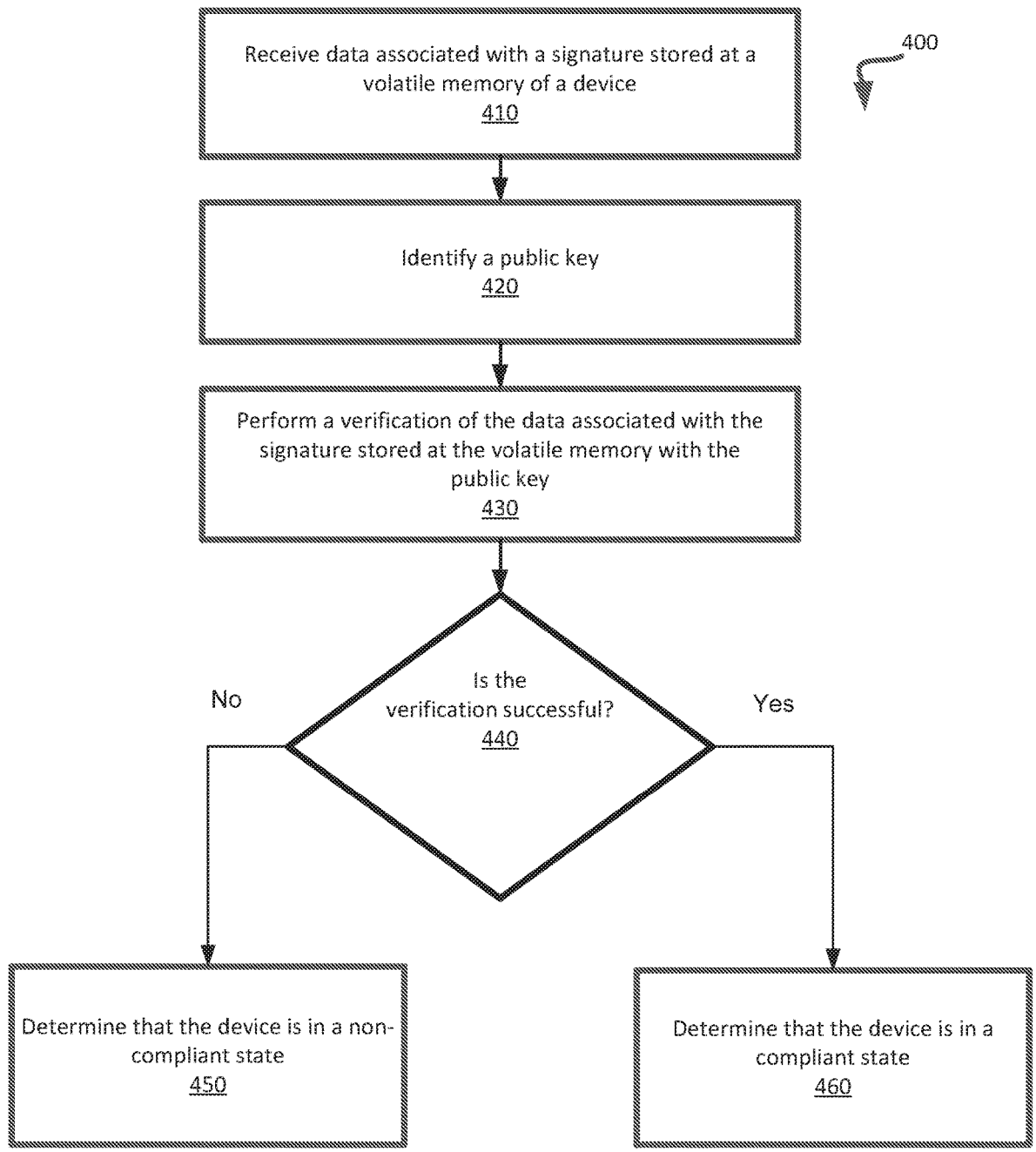
FIG. 4 is a flow diagram of an example method to determine an operating mode of a device based on a verification of a cryptographic item stored in a memory of the device in accordance with some embodiments of the present disclosure.

FIG. 4 is a flow diagram of an example method 400 to determine an operating mode of a device based on a verification of a cryptographic item stored in a memory of the device. In general, the method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 may be performed by the operating mode component 125 of FIG. 1.

As shown in FIG. 4, the processing device may receive data associated with a signature stored at a volatile memory of the device (block 410). The data associated with the signature may be a device identification of the device that has been signed by a private key as previously described. In some embodiments, the data may be received in response to an initialization or startup of the device. The processing logic may identify a public key (block 420). In some embodiments, the public key may correspond to a private key that was used to sign the device identification. For example, the public key may be used to verify whether the signature of the device identification is valid and signed by the manufacturing entity or is not valid and was not signed by the manufacturing entity. The public key may be stored at a software application of the device. The processing logic may subsequently perform a verification of the data associated with the signature that is stored at the volatile memory with the public key (block 430). For example, the public key stored at the software application may be used with the signed device identification to determine whether the signature is valid (e.g., verification is successful) or is not valid (e.g., verification is not successful).

Referring to FIG. 4, the processing device may determine whether the verification was successful or was not successful (block 440). If the verification of the signature of the signed device identification was successful, then the processing device may determine that the device is in a restricted operating mode (block 460). For example, the presence of the verified signature of the device identification may indicate that the device has not changed from the restricted operating mode. Otherwise, if the verification of the signature of the signed device identification was not successful, then the processing device may determine that the device is in a non-restricted operating mode (block 450). For example, the absence of the verified signature of the device identification may indicate that the device has been changed from operating in the restricted operating mode.

Figure 5:
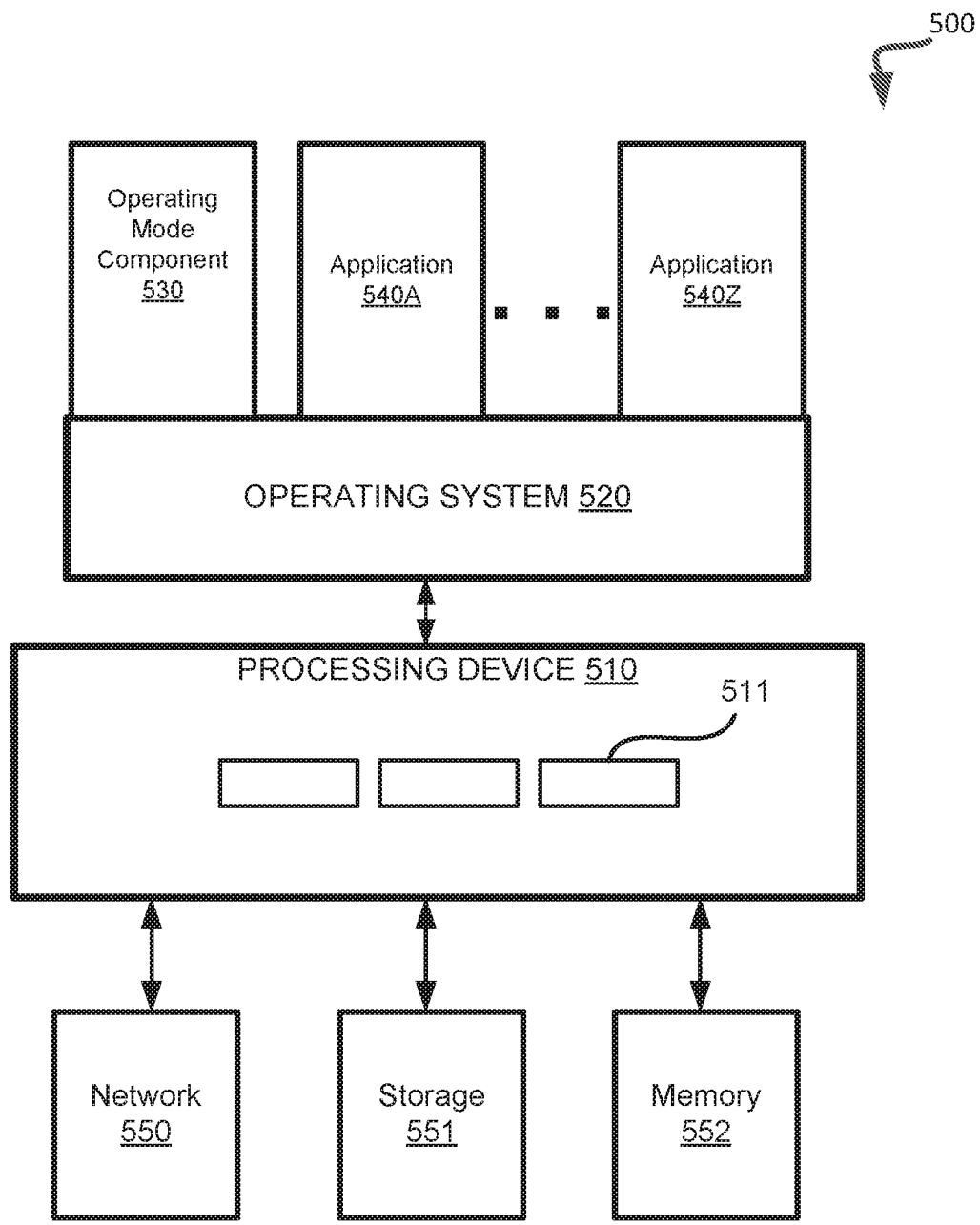
FIG. 5 illustrates an example network server that may erase a cryptographic item in a memory of the network server in response to a change of the operating mode of the network server in accordance with some embodiments of the present disclosure.

FIG. 5 illustrates an example network server 500 that may erase a cryptographic item in a memory of the network server in response to a change of the operating mode of the network server. In general, the device 100 of FIG. 1 may correspond to a network server that provides cryptographic operations for one or more other applications 540A to 540Z that are also hosted by the network server or another network server. In some embodiments, the network server 500 may provide a key management system that may operate in a restricted operating mode or a non-restricted operating mode as discussed above.

As shown in FIG. 5, the network server 500 may include a processing device 510 that may execute an operating system 520. Furthermore, the processing device 510 may include one or more internal cryptographic keys 511 that may be used to encrypt and decrypt data stored in a portion of a memory that is assigned to a secure enclave of the operating mode component 530. The access to the data of the operating mode component 530 in the secure enclave (e.g., data stored at a storage resource) may be protected from the one or more applications 540A to 540Z and the operating system 520. For example, the access to the data of the secure enclave corresponding to the operating mode component 530 may be protected by the use of one of the internal cryptographic keys 511 (e.g., the secure enclave key or a master key) that are internal to the processing device 510 so that the access to the data is based on a hardware access as opposed to a software access. The operating system 520 may be associated with a first privilege level and the operating mode component 530 and the applications 540A to 540Z may be associated with a second privilege level where the first privilege level of the operating system is more privileged than the second privilege level of the various applications that are run on the operating system 520 (e.g., the more privileged level allows access to more resources of the network server than the less privileged level). Thus, the operating system 520 may be allowed access to resources of the applications 540A to 540Z. However, since the operating mode component 530 is assigned to a secure enclave where access to the data of the secure enclave is based on the use of an internal cryptographic key 511 of the processing device 511, the operating system 520 may not be able to access the data of the operating mode component 530 despite having a more privileged level of access than the operating mode component 530. The master key that is used to decrypt data at the storage resource may be an internal cryptographic key 511.

In operation, the operating mode component 530 may be hosted on the network server with the applications 540A to 540Z. The application 540A may perform a function that may use a cryptographic operation with a cryptographic key. In order to securely store the cryptographic key and perform the cryptographic operation securely, the application 540A may establish a connection with a key management system of the server. For example, an attestation procedure may be performed by the application 540A to authenticate the key management system. After the key management system has been authenticated, a connection may be considered to be established between the application 540A and the key management system. The cryptographic key of the application 540A (e.g., used by cryptographic operation) may be provided to the key management system. Since the key management system is assigned to a secure enclave, the data of the key management system may be encrypted and protected by the use of an internal cryptographic key 511 (i.e., the master key) of the processing device 510. For example, the key management system may receive the cryptographic key of the application 540A and may transmit an instruction to the processing device 510 to store the received cryptographic key in the memory of its assigned secure enclave. In some embodiments, the key management system may transmit identification information of the key management system to the processing device 510 for the processing device 510 to load the received cryptographic key from the application 540A in the secure enclave of the key management system. The processing device 510 may use an instruction to use one of its internal cryptographic keys 511 that is based on the identification of the key management system to store the received cryptographic key in the memory of the secure enclave of the key management system. For example, the received cryptographic key may be securely (e.g., encrypted) stored in the storage 551 or memory 552 associated with the processing device 510 or at another storage resource over a network 550 (e.g., at a storage device of the storage resource). In some embodiments, one of the applications 540A to 540Z may provide a request to the key management system to generate a cryptographic key to be used in a cryptographic operation for the respective application 540A to 540Z. For example, the key management system may generate the cryptographic key and may store the cryptographic key in its memory of the secure enclave.

After the cryptographic key of the application 540A has been loaded in the secure enclave, the application 540A may subsequently request for a cryptographic operation to be performed with its cryptographic key. For example, the application 540A may provide a request to the key management system that identifies the cryptographic operation to be performed. The key management system may subsequently use an instruction so that the processing device 510 may use one of its internal cryptographic keys 511 that is based on the identification of the key management system to decrypt the data of the secure enclave of the key management system and to retrieve the cryptographic key. Subsequently, the cryptographic operation may then be performed (e.g., data may be decrypted or data may be signed by using the retrieved cryptographic key) by the processing device 510 and then the output of the cryptographic operation may be provided to the key management system which may return the output to the application 540A. In some embodiments, the internal cryptographic key 511 may be combined with additional information (e.g., the identification information of the key management system) to generate the master key for the key management system that is used to decrypt and/or encrypt data associated with the secure enclave of the key management system. Thus, since the processing device 510 uses its internal cryptographic key 511 to decrypt data and to perform the cryptographic operation, the cryptographic key received from the application may not be exposed external to the processing device 510.

As such, a network server may run a key management system and an application that may use the key management system for storing or loading keys and managing the use of the keys. The operating mode component 530 may modify a cryptographic item to indicate that the key management system is no longer running in a restricted operating mode. Although FIG. 5 illustrates that the key management system may provide secure key management for an application 540A to 540Z on the same network server, the key management system may alternatively be hosted by another network server or may be hosted by another network server that is external to any data center or network cluster that includes the network servers hosting applications 540A to 540Z.

Figure 6:
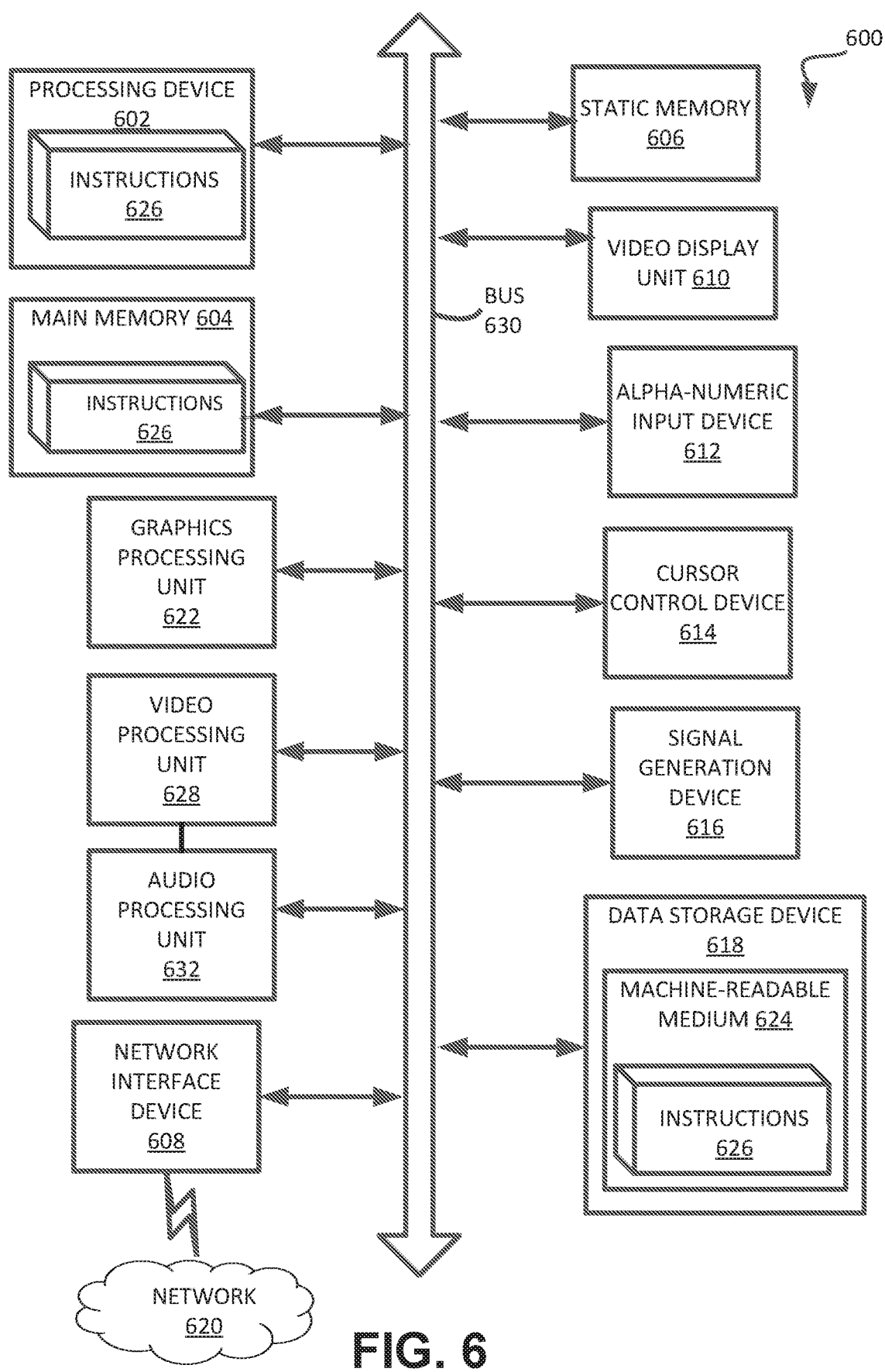
FIG. 6 illustrates an example computer system in which embodiments of the present disclosure operate.

FIG. 6 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a data storage device 618, which communicate with each other via a bus 830.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 608 to communicate over the network 620. The computer system 800 also may include a video display unit 610 (e.g., a liquid crystal display (LCD) or a cathode ray tube (CRT)), an alphanumeric input device 612 (e.g., a keyboard), a cursor control device 814 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In one implementation, the instructions 626 include instructions to implement functionality as described herein. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing certain terms may refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
receiving an indication of a change to an operating mode of a device, wherein the indication of the change to the operating mode of the device corresponds to a detection of a tampering of the device, and the tampering of the device is associated with an opening of the device;
identifying a cryptographic item stored at a memory of the device, wherein the cryptographic item corresponds to an identification of the device with a digital signature, and wherein the digital signature is based on a private key that is inaccessible to the device;
in response to receiving the indication of the change to the operating mode of the device, modifying, by a processing device, the cryptographic item stored at the memory; and
operating the device in the changed operating mode based on the modified cryptographic item.

2. The method of claim 1, wherein the memory is a volatile memory, and wherein modifying the cryptographic item stored at the memory comprises:
stopping a providing of power to the volatile memory to erase the cryptographic item stored at the volatile memory.

3. The method of claim 1, wherein the memory is a non-volatile memory, and wherein modifying the cryptographic item stored at the memory corresponds to an overwriting or an erasing of the cryptographic item stored at the non-volatile memory.

4. The method of claim 1, wherein the cryptographic item indicates the operating mode of the device, and wherein an absence of the cryptographic item after the modifying of the cryptographic item indicates that the operating mode of the device has changed.

5. A system comprising:
a memory; and
a processing device, operatively coupled with the memory, to:
receive an indication of a change to an operating mode of a device, wherein the indication of the change to the operating mode of the device corresponds to a detection of a tampering of the device, and the tampering of the device is associated with an opening of the device;
identify a cryptographic item stored at a memory of the device, wherein the cryptographic item corresponds to an identification of the device with a digital signature, and wherein the digital signature is based on a private key that is inaccessible to the device;
in response to receiving the indication of the change to the operating mode of the device, modify the cryptographic item stored at the memory; and
operate the device in the changed operating mode based on the modified cryptographic item.

6. The system of claim 5, wherein the memory is a volatile memory, and wherein to modify the cryptographic item stored at the memory, the processing device is further to:
stop a providing of power to the volatile memory to erase the cryptographic item stored at the volatile memory.

7. The system of claim 5, wherein the memory is a non-volatile memory, and wherein modifying the cryptographic item stored at the memory corresponds to an overwriting or an erasing of the cryptographic item stored at the non-volatile memory.

8. The system of claim 5, wherein the cryptographic item indicates the operating mode of the device, and wherein an absence of the cryptographic item after the modifying of the cryptographic item indicates that the operating mode of the device has changed.

9. A non-transitory computer readable medium comprising data that, when accessed by a processing device, cause the processing device to perform operations comprising:
receiving an indication of a change to an operating mode of a device, wherein the indication of the change to the operating mode of the device corresponds to a detection of a tampering of the device, and the tampering of the device is associated with an opening of the device;
identifying a cryptographic item stored at a memory of the device, wherein the cryptographic item corresponds to an identification of the device with a digital signature, and wherein the digital signature is based on a private key that is inaccessible to the device;
in response to receiving the indication of the change to the operating mode of the device, modifying the cryptographic item stored at the memory; and
operating the device in the changed operating mode based on the modified cryptographic item.

10. The non-transitory computer readable medium of claim 9, wherein the memory is a volatile memory, and wherein to modify the cryptographic item stored at the memory, the operations further comprise:
stopping a providing of power to the volatile memory to erase the cryptographic item stored at the volatile memory.

11. The non-transitory computer readable medium of claim 9, wherein the memory is a non-volatile memory, and wherein modifying the cryptographic item stored at the memory corresponds to an overwriting or an erasing of the cryptographic item stored at the non-volatile memory.

12. The non-transitory computer readable medium of claim 9, wherein the cryptographic item indicates the operating mode of the device, and wherein an absence of the cryptographic item after the modifying of the cryptographic item indicates that the operating mode of the device has changed.

* * * * *